(12) United States Patent
Blackburn et al.

(10) Patent No.: US 8,392,734 B2
(45) Date of Patent: Mar. 5, 2013

(54) POWER MANAGEMENT OF COMPUTERS BY DETECTING ACTIVE PROCESSES IN THE ABSENCE OF INPUT ACTIVITY

(75) Inventors: Mark Blackburn, London (GB); Rajpal Wikhu Singh, London (GB); Roger Lipscombe, London (GB); Sophie Chang, London (GB)

(73) Assignee: 1E Limited, London (GB)

( * ) Notice: Subject to any disclaimer, the term of this patent is extended or adjusted under 35 U.S.C. 154(b) by 566 days.

(21) Appl. No.: 12/609,780

(22) Filed: Oct. 30, 2009

(65) Prior Publication Data

US 2010/0131785 A1    May 27, 2010

(30) Foreign Application Priority Data

Nov. 24, 2008  (GB) .................................. 0821414.0

(51) Int. Cl.
    *G06F 1/32* (2006.01)
(52) U.S. Cl. ...................... 713/323; 713/324
(58) Field of Classification Search ............... 713/323, 713/324; 710/18; 718/102
    See application file for complete search history.

(56) References Cited

U.S. PATENT DOCUMENTS

| 5,845,138 A * | 12/1998 | Nowlin, Jr. ............... 713/323 |
| 5,953,536 A * | 9/1999 | Nowlin, Jr. ............... 713/323 |
| 6,408,395 B1 | 6/2002 | Sugahara et al. |
| 7,251,737 B2 * | 7/2007 | Weinberger et al. ........ 713/320 |

FOREIGN PATENT DOCUMENTS

GB        2467844 A   *   8/2010

\* cited by examiner

*Primary Examiner* — Albert Wang
(74) *Attorney, Agent, or Firm* — Baker & Hostetler LLP (57) ABSTRACT

A method of controlling power consumption in a computer uses a power management program installed on the computer to detect the identities of processes running on the computer which maintain the computer in a high power state in the absence of input activity. The program compares the identity of the or each process running on the computer with a set of identities of previously identified processes and causes the computer to adopt a low power state if the detected identity of a process, or the detected identities of all the processes, running on the computer is/are in the set of previously identified processes.

24 Claims, 7 Drawing Sheets

FIGURE 6

POWER MANAGEMENT OF COMPUTERS BY DETECTING ACTIVE PROCESSES IN THE ABSENCE OF INPUT ACTIVITY

CROSS-REFERENCE TO RELATED APPLICATIONS

This application claims priority under 35 U.S.C. §119(a) to GB App. No. 0821414.0, filed on Nov. 24, 2008, the entire disclosure of which is hereby incorporated by reference.

BACKGROUND OF THE INVENTION

1. Field of the Invention

The present application relates to power management of computers.

2. Description of the Related Technology

Computers consume electrical energy and reducing energy consumption reduces the costs of running computers. A company may run a very large number of computers. A small saving in energy consumption on each computer results in a large overall saving of energy and thus cost for the company. It is known to monitor activity of a computer and, if an idle state is detected, cause the computer to adopt a low, or lower, power state. That is a well known function within, for example, the Windows™ operating system.

WO 2007/002801 describes a system and method of controlling power in a multi-threaded processor, in particular a processor used in battery powered device such as a mobile telephone, MP3 player or PDA. The activity of threads is monitored and, if all threads are inactive, global resources such as instruction execution units and data and instruction caches, amongst others, are set to a low power state. WO 2007/002801 also describes a development tool, or debug procedure, in which the power states of threads are displayed to detect threads which do not adopt a low power state to enable a programmer to modify the programming so that such threads will, in normal operation, adopt low power states when appropriate to ensure that energy consumption can be reduced.

SUMMARY OF CERTAIN INVENTIVE ASPECTS

In accordance with one aspect of the present invention, there is provided a method of controlling power consumption in a computer, the method comprising using a power management program installed on the computer to detect the identity of the or each process running on the computer which maintains the computer in a high power state in the absence of input activity; compare the identity of the or each process running on the computer with a set of identities of previously identified processes; and cause the computer to adopt a relatively low power state if the detected identity of a process, or the detected identities of all the processes, running on the computer is/are in the set of previously identified processes.

The set of identities may comprise one or more identities.

A further embodiment also provides a computer arranged to carry out the method of controlling power consumption as set forth above.

Some embodiments also provide a computer program which, when run on a computer, causes the computer to implement the method of the one aspect of the invention.

Another aspect of the invention provides a computer implemented method comprising running a program on a computer to detect the identities of the or each process running on the computer which maintains the computer in a high power state in the absence of input activity, and send the identity of the or each detected process to an administrator for review of the processes so identified, and for the administrator to create a set of the identities of those processes the administrator judges should not prevent the computer adopting a low power state; and further comprising storing in the computer the set created by the administrator.

The administrator may amend the set, add processes to the set, or delete processes from the set.

This aspect provides a method of creating the set for use in the method of the aspect described immediately above.

Further features and advantages of the invention will become apparent from the following description of embodiments of the invention, given by way of example only, which is made with reference to the accompanying drawings.

DETAILED DESCRIPTION OF CERTAIN INVENTIVE EMBODIMENTS

Figure 1A:
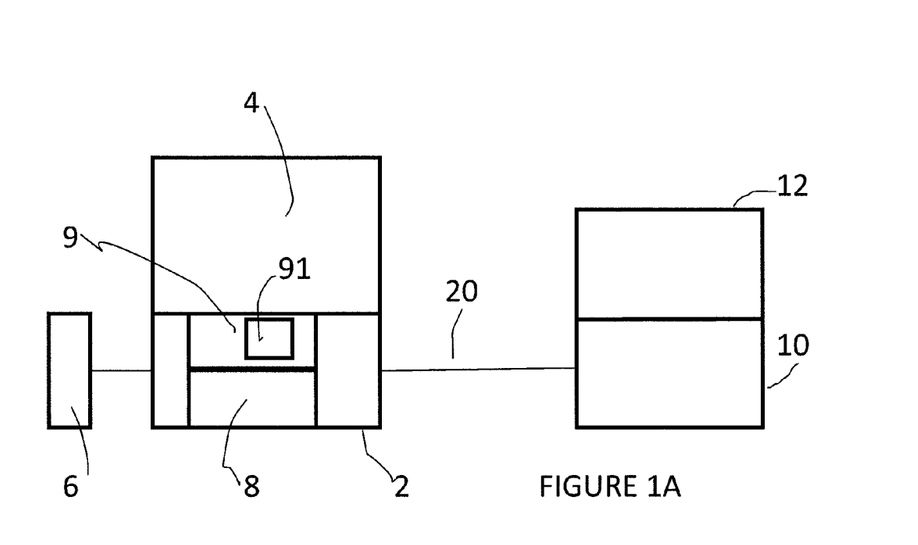
FIG. 1A is a schematic block diagram of two computers linked by a network.

Referring to FIG. 1A, a computer 2 has a display 4 and one or more user input devices for example a keyboard 8 and a pointing device 6 for example a mouse or a track pad. The computer has a CPU 9 and a memory or data store 91 amongst other conventional components (not shown). The computer 2 may be a desk top computer or a laptop PC operating alone or as a server. It may be linked by a communications link 20 to another computer 10 having a display 12 which may be an administrator's workstation.

Figure 1B:
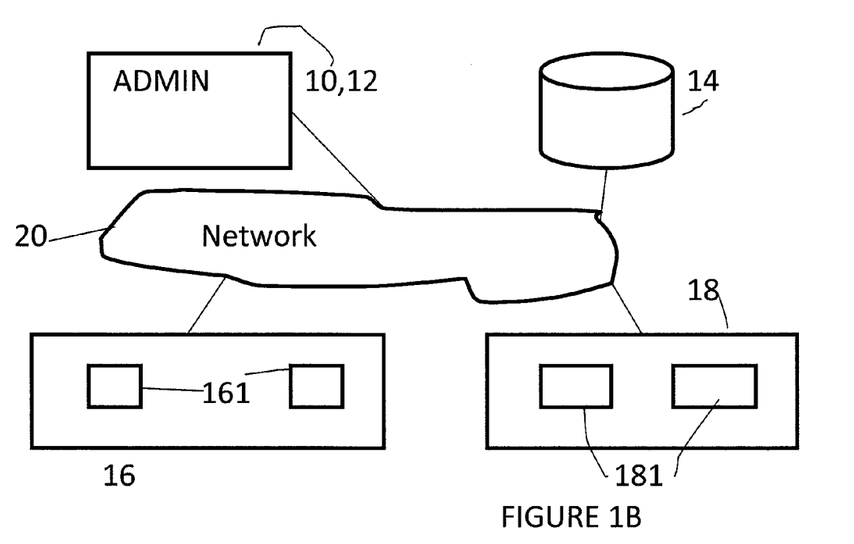
FIG. 1B is a schematic block diagram of networks of computer systems linked to an administrator's computer and a database.

Referring to FIG. 1B, a networked computer system has a plurality of subnets 16 and 18 each comprising many computers 161, 181. The subnets are connected by a network 20, to an administrator's work station 10, 12 and to a conventional database 14.

Figure 1C:
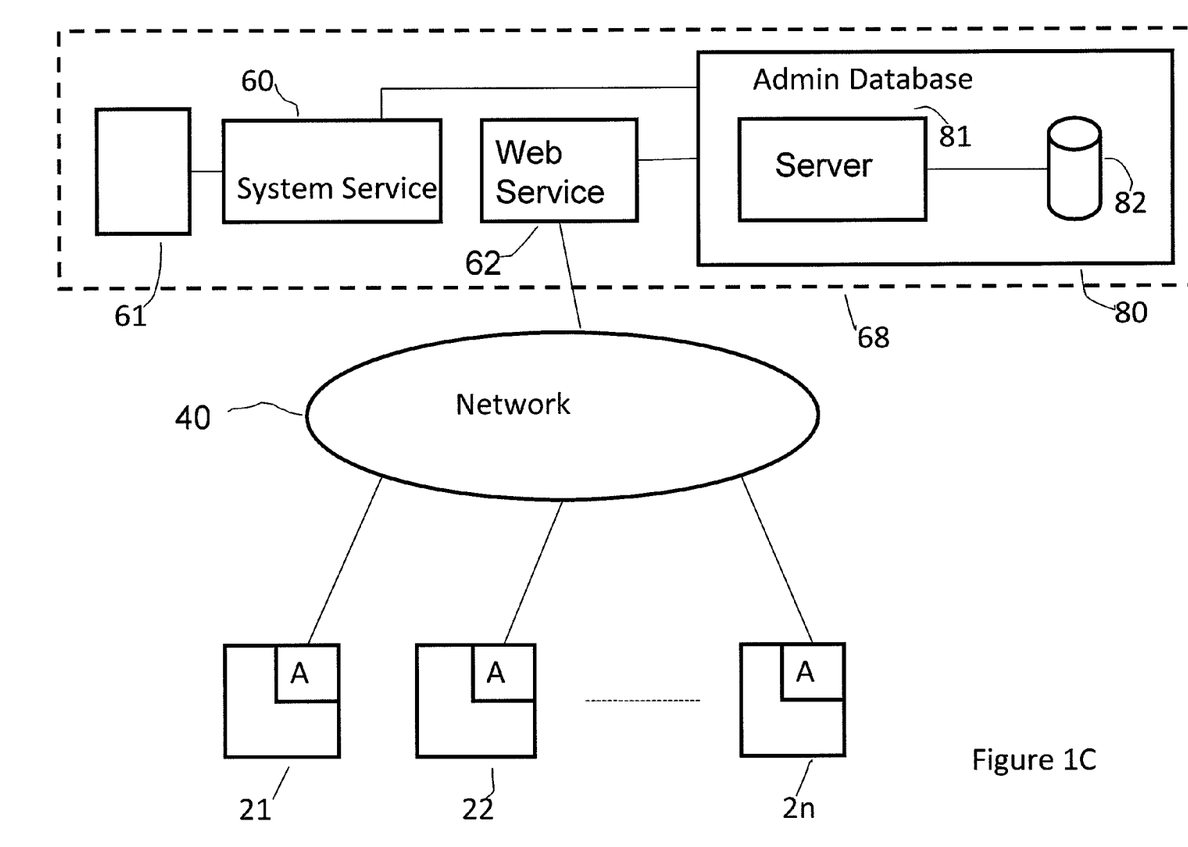
FIG. 1C is a schematic block diagram of another network of servers linked to an administrator's workstation and a database.

Referring to FIG. 1C, a networked computer system comprises a plurality of servers 21, 22, 2n, an administrator's workstation 60 with a display device 61, a web service 62 running on a computer, and an administrative database 80. The web service 62 is connected by a network 40 to the servers 2n. The administrator's workstation 60 interacts with the database 80. The web service 62 interacts with the database and the servers 2n. The servers 21 to 2n may be servers of a large server farm having a large number of servers, for example hundreds or more servers which may be arranged in subnets as shown in FIG. 1B. The database 80 may itself comprise a server 81 having a data storage device 82. The database 80 and the workstation 60 together form a monitoring system 68.

Controlling power consumption, whether of a single computer 2 as in FIG. 1A or of many computers as in FIG. 1B or FIG. 1C, reduces energy consumption and reduces the cost of running the computer(s). For a large network as in FIG. 1B or 1C with many computers the overall cost saving may be large.

An operating systems, for example Windows (Trade Mark) includes a power manager which causes a computer to adopt a low power state, for example a sleep state, in the absence of user input. Such a power manager has an idle timer which causes the computer to adopt a low power state after a time determined by the power manager.

1e Limited, assignee of the present patent application, provides power management tools for computers. The tools they provide monitor and control power consumption. The tools also collect and store data relating to the power consumption of computers. It has been found that, despite the use of a power manager in the operating system, some computers do not adopt a low power state for a variety of reasons.

(i) One reason is user activity for example use of a pointing device or input device by a user; such use resets the idle timer of the power manager.

(ii) Another reason is CPU activity rising above a threshold level which resets the idle timer. There may be several processes active and the idle timer of the operating system is reset when the overall activity of the CPU crosses the threshold level (iii) A further reason is a thread in a process raises a flag stating it requires system resources and maintains the computer in a high power state; hereinafter referred to as the flag being set. A process in which the thread runs keeps the computer active and does not allow the computer to adopt a low power state. (It will be appreciated that some processes may be active without a thread which raises such a flag. Such processes will be safely terminated by the operating system if the operating system causes the computer to enter the low power state.)

A problem faced in the art is to distinguish between processes which should not be allowed to maintain a computer in a high power state and other processes which should be allowed to maintain a computer in a high power state.

Figure 2:
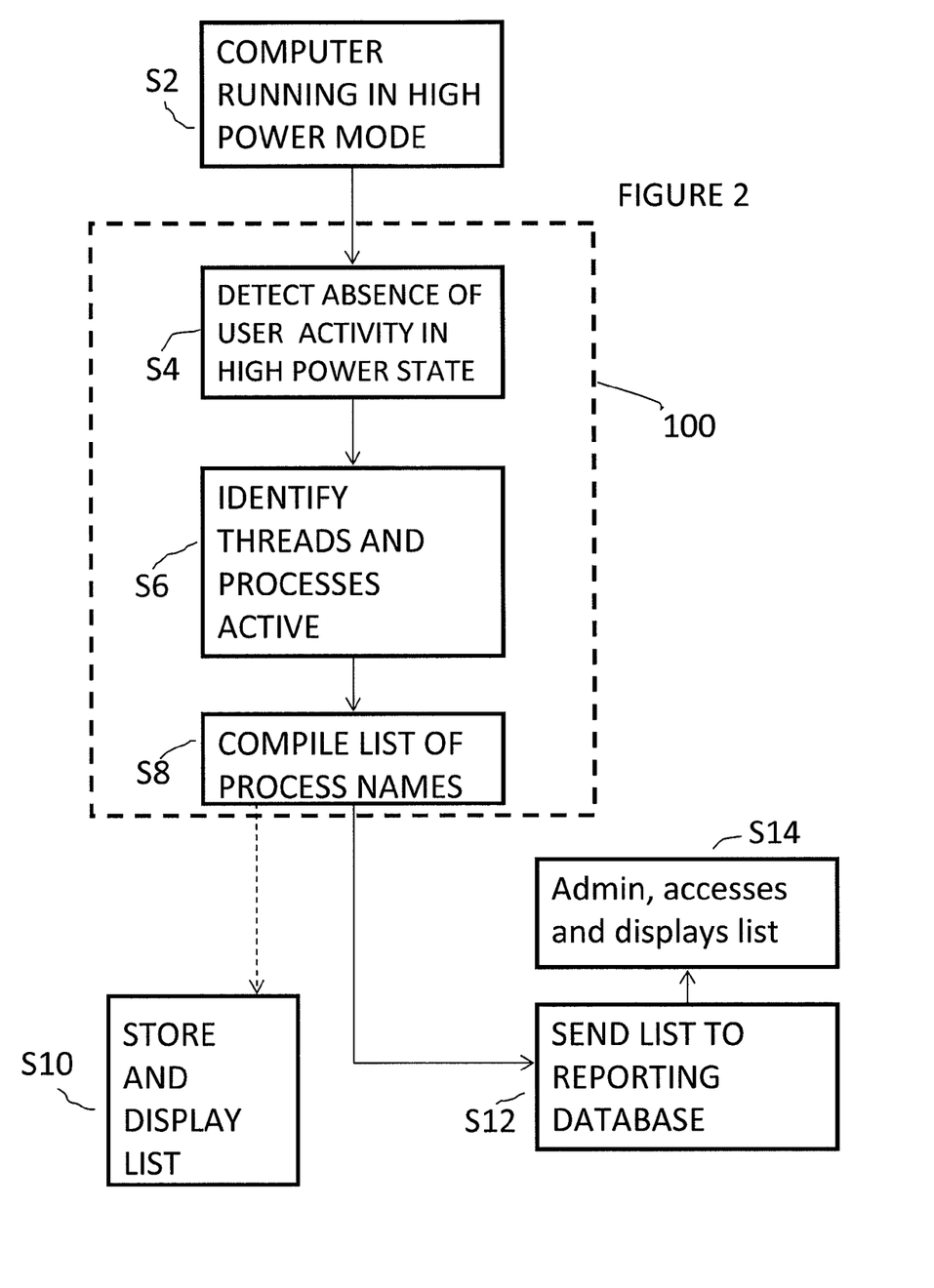
FIG. 2 is a flow chart of a procedure for identifying and listing processes active in a computer.
Figure 4:
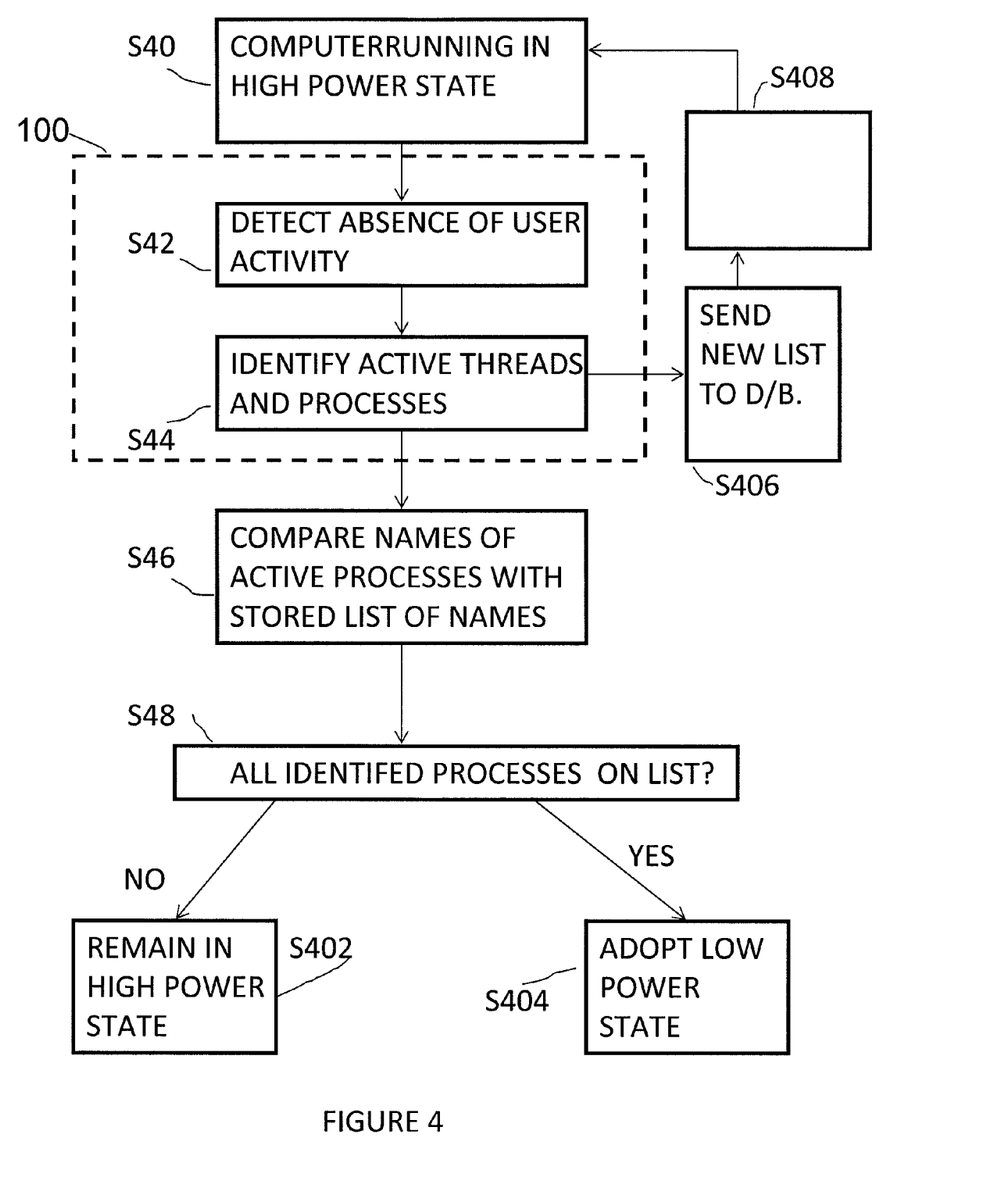
FIG. 4 is a flow chart of a procedure carried out in a computer for managing power consumption.
Figure 6:
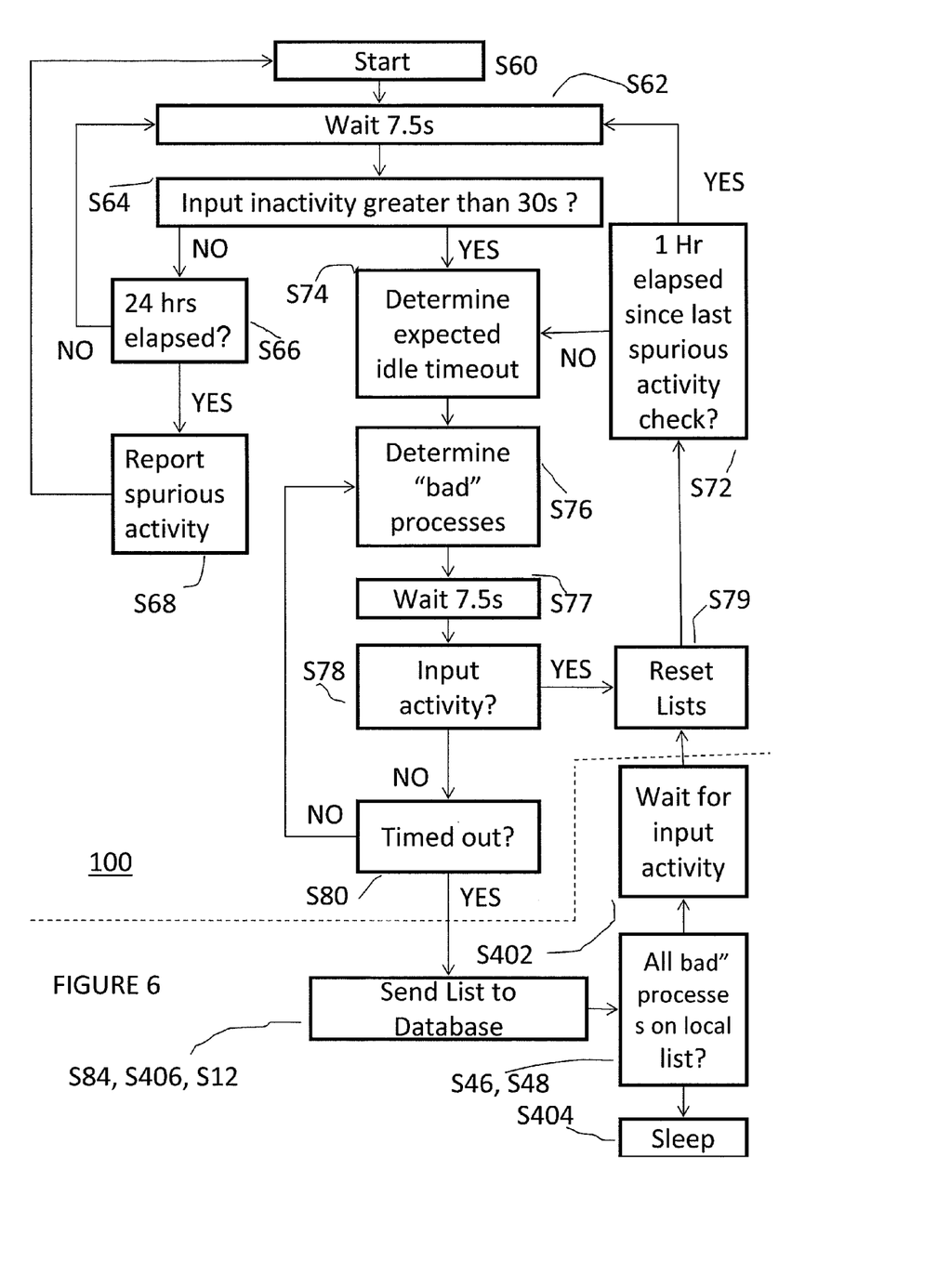
FIG. 6 is a flow chart of another example of a procedure useful in the procedures of FIGS. 2 and 4 for managing power consumption.

One or more embodiments of the present invention, as described with reference to FIGS. 2, 4 and 6, are implemented by a power management program run on the computer 2 of FIG. 1A or on each computer 161, 181 in the system of FIG. 1B or on each server 2n of FIG. 1C. The program is indicated by A in FIG. 1C.

Consider one computer which may be the stand alone computer 2 of FIG. 1A or any one of the computers 161, 181 in the network of FIG. 1B or one of the servers 2n of FIG. 1C. Referring to FIG. 2, assume in step S20, the computer is running one or more processes in a high power mode. The computer is continuously monitored by the power management program, and, in this example, in step S4 activity in the high power state is detected by monitoring user inputs and, in the absence of user input over a predetermined period of time, steps S6 and S8 are carried out. It will be appreciated that FIG. 2 is schematic and steps S4, S6 and S8 are not necessarily carried out sequentially as indicated.

In step S6, the threads having the aforesaid flag set which are running on the machine are found and identified. Threads have thread identifiers as do processes. Processes also have names. A thread including the set flag which indicates the thread is active, maintains the computer in a high power state. Step S6 examines the flag(s) of the thread(s) and determines the identifiers (IDs) of the thread(s) for which the flag is set. The processes within which the thread(s) run are thereby identified and are referred to hereinafter as active processes.

In addition, in this example, a process or processes which cause(s) the CPU to remain above the threshold which resets the idle timer are also identified. Thus two types of processes are identified A list of the names of the active processes is compiled in step S8. There may be only one process name on the list or there may be a plurality of process names on the list. Names of active processes are listed because names are the same regardless of the machine on which the process is running whereas IDs may differ from machine to machine. The list includes the names of the processes having threads with the system required flag set. The list also includes the name of the process using the highest CPU resource at the time of overall CPU activity above the threshold recorded during the predetermined period of time. The list identifies the types of the processes.

For a stand-alone computer 2 as in FIG. 1A, the list is automatically stored in the computer at a predetermined location in memory and, under the control of the user, displayed S10 on the display device 4 for review by the user. Alternatively the list is automatically sent by the communication link 20 to another computer 10, 12 for review by another person, for example an administrator. The reviewed list is, in this example, downloaded to the computer 2.

For networked computers in a computer system, as in FIG. 1B, the list from each computer 161, 181 is automatically sent S12, to a data base, for example the database 14 of FIG. 1B or database 80 of FIG. 1C and in step S14, the administrator accesses the list, reviews and edits it on his/her workstation 10, 12. The list includes an identifier of the computer, for example its name and domain. Some computers may not detect active processes and so not all the computers will send lists.

Figure 3:
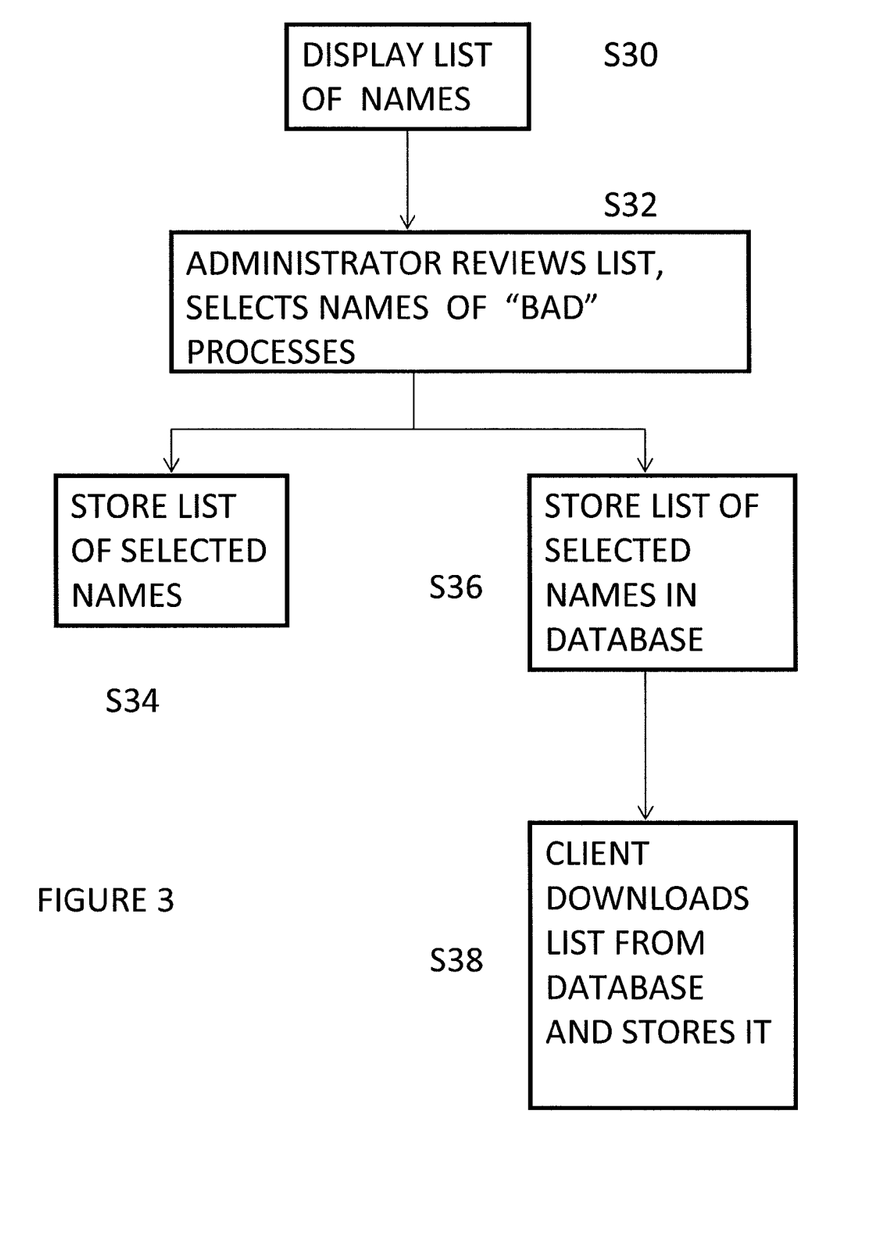
FIG. 3 is a flow chart of procedures carried out by an administrator.

Referring to FIG. 3, the administrator of the network of FIG. 1B or 1C displays in step S30 a list received from one of the computers 161,181. The administrator reviews the list and, using his skill and judgment, determines which of the listed processes should not be allowed to maintain a computer in a high power state and which processes should be allowed to maintain a computer in a high power state. By way of example only, an administrator may decide that a process which is playing back music should not be allowed to maintain a computer in a high power state and would decide a process involved in a mathematical calculation within say a spreadsheet, or a math program, should be allowed to maintain a computer in a high power state.

The administrator edits the list. In this example the administrator produces a list listing only "bad" processes: i.e. processes which should not be allowed to maintain a computer in a high power state. In step S36 the list is stored in the database 14 with the ID of the computer to which it applies. In step S38 the client computer 161,181 or server 2n downloads the list from the policy database 14. The list is stored in the computer at a memory location.

The downloading may be automatic if the list is configured in the database for the machine which receives the list. Alternatively, the list can be sent direct to the computer via the command line or by setting a registry entry. Likewise, for a single computer as shown in FIG. 1A, the user or an administrator reviews the list and stores the edited list in the computer.

Referring to FIG. 4, consider a computer 161, 181 of FIG. 1B or a server 2n of FIG. 1C or a stand-alone computer 2 of FIG. 1A. The computer has the stored list produced by the procedure of FIG. 3. In step S40, the computer is running a process or processes in the high power state. In step S42, the power management program detects absence of user activity as described with reference to FIG. 2 and in step S44 identifies the threads whose flags are set, and thus the corresponding active processes, again as described with reference to FIG. 2. In addition, in this example, a process or processes which cause(s) the CPU to remain above the threshold which resets the idle timer are also identified. The names of the active processes are compared with the names on the stored list by the power manager in step S46. In step S48 if all the active processes identified in step S44 are on the list, then all the active processes are "bad" and in step S404 a low power state is initiated. That may be done by activating a program present in the operating system; for example Windows includes a program for adopting the low power state. If one or more of the active processes identified in step S44 is/are not on the list then the computer remains in the high power state as indicated by step S402.

A list of the names of the active processes identified in step S46 is sent in step S406 (corresponding to step S12 in FIG. 2) to the database 14. In this way the computer may be continuously monitored and data gathered about processes which have threads which keep computers in a high power state. In step S408, the functions of FIG. 3 are performed including step S32 of downloading the edited list to the client computer.

The procedure of FIG. 4 may be implemented in a manner incorporating the procedure of FIG. 2. In a first iteration, the list is empty. A process or processes is/are run in step S40 and the absence of user activity is detected in step S42. Threads with set flags and the corresponding active processes are identified in step S44 and a list of the names of the active processes is sent in step S406 to the database in step S406. The administrator reviews and edits the list and it is downloaded to the computer in step S408. On this first iteration because the list is empty the computer will remain in the high power state. On a second, and subsequent, iteration, assuming the list now contains the name(s) of one or more bad processes, any bad processes are identified and result in the computer adopting the low power state in accordance with steps S44, S46, S48 and S404.

Figure 5:
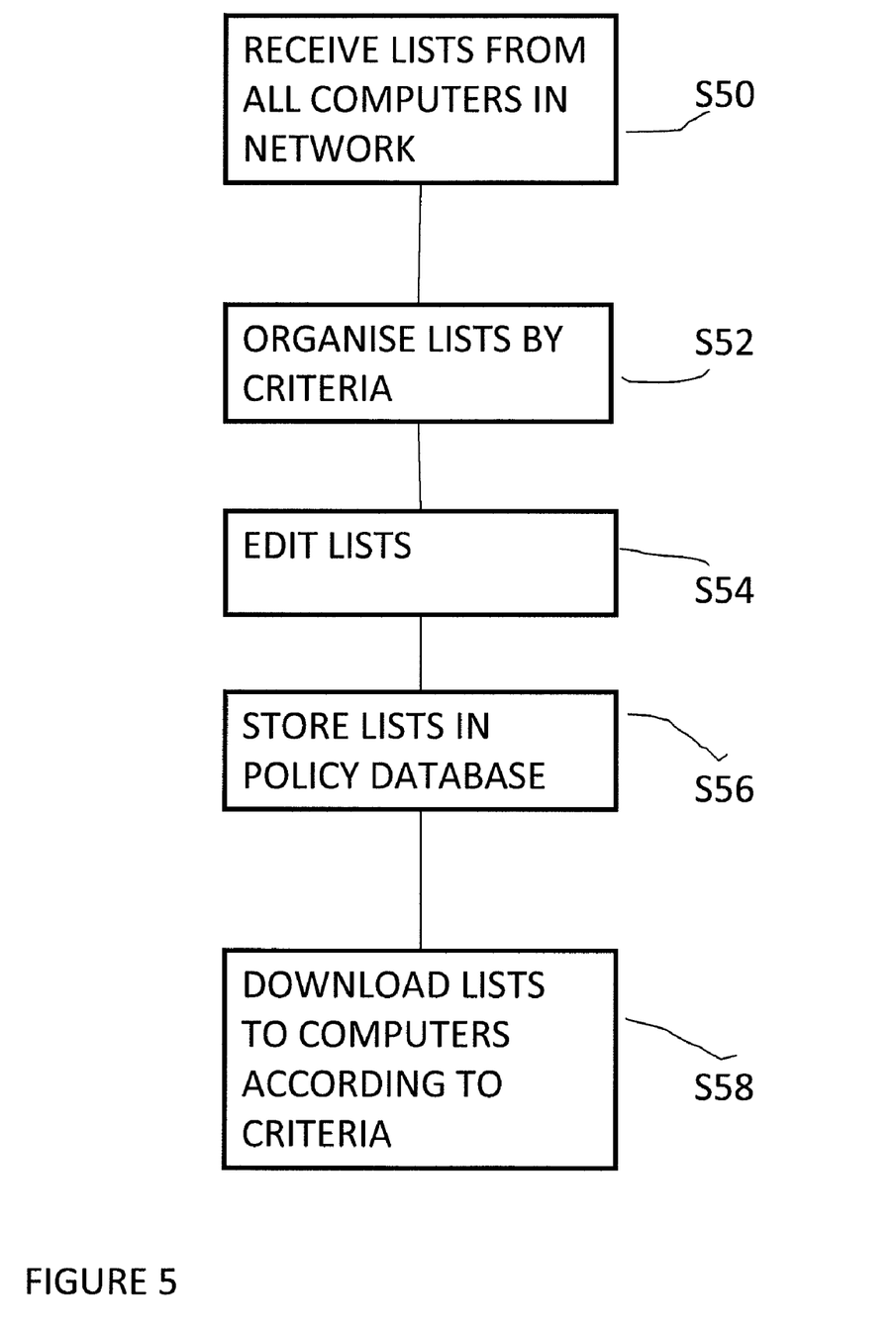
FIG. 5 is a flow chart of other administrative procedures.

The foregoing description considered only a single computer and may thus apply to the stand alone computer 2 of FIG. 1A and to a single one of the computers 161, 181 of FIG. 1B or a single one of the servers of FIG. 1C. However the system of FIG. 1B or 1C has many computers. Referring to FIG. 5, the administrator's workstation receives over time in step S50 lists from all the computers on the network. The lists include the IDs of the computers. In step S52, the lists are organized according to criteria chosen by the administrator. For example all the lists from computers on one subnet 16 may be combined into one, aggregated, list of bad processes used to manage power usage of all the computers in the subnet. Other examples include aggregating lists by type of computer, type of operating system or any other criterion or set of criteria chosen by the administrator. As set out in step S54 the lists are edited: this may be done before or after aggregation. The resulting lists are stored in the database 14 in step S56 and in step S58 downloaded to the client computers grouped according to the criteria chosen by the administrator.

The examples described above operate at least partly on the basis of the absence of any user input. An input device may be faulty and produce signals indicative of user input even when not in use by a user. There are also simulation programs which simulate user input for the purpose of preventing a computer adopting a low power state. When for example a user views a video there is no input from the user. Some power management programs detect the absence of input from the user and put the computer in a low power state after a set time interrupting the video. A simulation program may be used to override the power management program so a video can be viewed uninterrupted. Inputs from simulation programs and from faulty devices are referred to hereinafter as spurious input activity.

FIG. 6 is a flow chart of a procedure 100 useful as indicated by 100 in FIGS. 2 and 4 for detecting spurious input activity and for detecting active processes. The power management program in the example of FIG. 6 checks in steps S62 and S64, every 7.5 seconds, whether input activity took place within the last thirty seconds. This information is provided by a counter value of the operating system. If, in step S66, it is determined that the input activity has persisted for 24 hours it is determined the input activity is spurious and is reported to the database 14. The checking repeats for the next period of 24 hours. The spurious activity is reported S68 once every 24 hours in this example. The periods of 7.5 seconds, 30 seconds and 24 hours are all examples. In one embodiment of the invention, they are selectable by for example the administrator.

The administrator views the report(s) and may investigate to determine what, if any, action to take. Spurious input activity will maintain the computer in the high power state until action is taken, by the administrator for example, to stop it.

If no spurious activity is detected, and the computer is in a high power state as indicated by step S70, steps S60, S62 and S64 are repeated S72 every hour to check whether spurious activity has begun since the last (negative) check as indicated by step S76. Again, the period of 1 hour is an example and is a time selectable by for example the administrator.

If there is no spurious activity, the expected idle time-out time is determined from the operating system in step S74. The threads having flags set are detected and the corresponding processes are identified and their names listed in step S76. In addition, in this example, a process or processes which cause(s) the CPU to remain above the threshold which resets the idle timer is/are also identified. In steps S77 and S78 it is determined every 7.5 seconds whether there is or has been any input activity. If there is such input activity, the list is reset in step S79. If the one hour of step S72 has not expired, the expected idle time and determined time-out time are reset, and steps S74, S76, S77 and S78 repeated. If the one hour has elapsed, the check for spurious user activity process starts again at step S62.

If, as tested by step S78, no input activity occurs during the expected time-out time and in step S80 time-out occurs within the expected time because all the identified threads have unset their flags, or there were no threads with set flags, then the operating system causes the computer to adopt a low power state indicated by "sleep" in FIG. 6.

In step S80, it is determined no input activity has occurred and at least one thread has a flag set and/or CPU activity is above the threshold level. If that is determined, then the list of step S76 is reported in step S84 to the data base 14 as indicated by step S12 in FIG. 2 and step S406 in FIG. 4. As in the procedure of FIG. 4, the list of step S76 is also compared in step S46 with the list of bad processes and the steps S48 and S402 or S404 are carried out to either force the computer into the low power state if all the listed processes are bad or otherwise maintain the computer in the high power state.

The examples described above collect data relating to bad processes and, over time, accumulate lists of bad processes, allowing power control of computers to be enhanced by overriding processes which, in the judgment of an administrator, unnecessarily maintain computers in a high power state.

It is known how to identify threads and processes and to determine which threads and processes are running on a computer. Threads are identified by a thread structure which is stored at a specific location by the operating system. Different operating systems and even different versions of the same operating system have different locations for storing the thread structure. It is also known how to identify processes which cause a CPU to remain above the threshold which resets the idle timer are also identified and to distinguish the types of processes.

Embodiments of the invention may be used with any operating system including the various versions of Windows (Trade Mark) and UNIX (Trade Mark) with suitable programming: different versions may be needed for different operating systems.

The above embodiments are to be understood as illustrative examples of the invention. Further embodiments of the invention are envisaged. For example, the above embodiments produce lists of "bad" processes which are stored in computers to control power usage. However, the certain embodiments of the invention could use a list of "good" processes which is stored in a computer and allow a computer to maintain high power state only if it is running one or more good processes. The power management program would raise the system required flag on behalf of any good process thus maintaining the computer in the high power state.

The list of good processes is produced in one example of the invention by being manually entered by the administrator, either from his admin console into the database and then pulled down by the computer automatically, or manually from a command line or update to the local registry.

The list of bad processes may not be stored on the computer but elsewhere in a data base to which the computer has access via a communications link or network. Instead of storing the list on the computer a link to the list may be stored.

In some embodiments, the invention also provides a computer program which when run on a computer implements the procedures described above. The computer program may be on a carrier, for example a computer readable medium for example a hard disk, an optical disc, a magneto-optical disk, a compact disc, a magnetic tape, electronic memory including Flash memory, ROM, RAM, a RAID or any other suitable storage device.

As described above the computer adopts a low power state. Examples of low power states include, amongst others:

Sleep/Standby—the processor is powered down but the system state is preserved as the memory subsystem (RAM) is still powered;

Hibernate—the processor and RAM are powered down and the system state stored in non-volatile memory, e.g. hard disk; and Shut down—the Computer is powered down but power may be applied to certain components to trigger wake-up.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling power consumption in a computer, the method comprising:
   detecting, by a processor, the identity of each process running on the computer which maintains the computer in a high power state in the absence of input activity;
   comparing, by the processor, the identity of each process running on the computer with a set of identities of previously identified processes; and
   causing, by the processor, the computer to adopt a power state in which at least the processor is powered down if the detected identity of a process, or the detected identities of all the processes, running on the computer is/are in the set of previously identified processes.

2. The method of claim 1, wherein the set of identities of previously identified processes is stored on the computer.

3. The method of claim 1, wherein a link to the set is stored on the computer and the power manager compares the identity of detected each process running on the computer with the set.

4. The method of claim 1, further comprising downloading, by the processor, the set of previously identified processes from another computer.

5. The method of claim 1, wherein detection of the identities of processes running on the computer which maintain the computer in a high power state in the absence of input activity comprises detecting, in the high power state, absence of input activity over a set period of time.

6. The method of claim 5, further comprising determining from the operating system of the computer the time delay expected by the operating system before the operating system causes the computer to adopt the low power state, the time delay being the set period of time.

7. The method of claim 1, wherein the input activity comprises operation of at least one of a user input device and a pointing device.

8. The method of claim 1, wherein detecting the identity of a process running on the computer which maintains the computer in a high power state in the absence of input activity comprises detecting a thread which has a flag set to require system resources and identifying the process within which the thread runs.

9. The method of claim 1, wherein detecting the identity of a process running on the computer which maintains the computer in a high power state in the absence of input activity comprises identifying any process which causes the activity of a processor of the computer to be above a predetermined threshold level in the absence of input activity.

10. The method of claim 1, further comprising detecting spurious input activity.

11. The method of claim 10, comprising checking input activity at preset intervals over a preset period of time and determining input activity is spurious if input activity is found at every checking interval over the preset period.

12. The method of claim 10, further comprising reporting the detection of spurious activity to a database.

13. The method of claim 1, further comprising:
   presenting the detected identity of each detected process to an administrator for review of the processes so identified, and for the administrator to create a set of the identities of those processes which the administrator judges should not be allowed to maintain the computer in a high power state; and
   storing, by the processor, the set created by the administrator or a link to the set.

14. The method of claim 13, further comprising the steps of: the administrator reviewing the list sent by the computer and selecting the or each process which the administrator judges should be in the set of previously identified processes, and updating the set of previously identified processes.

15. The method of claim 14, wherein the set of previously identified processes is stored in a database for downloading by the computer.

16. The method of claim 1, further comprising sending, by the processor, the detected identity of each process running on the computer to an administrator for review.

17. A non-transitory digital storage medium storing a computer program which, when run on a computer, provides a method for controlling power consumption of the computer, the method comprising:
   detecting, by a processor, the identity of the or each process running on the computer which maintains the computer in a high power state in the absence of input activity;
   comparing, by the processor, the identity of the or each process running on the computer with a set of identities of previously identified processes; and
   causing, by the processor, the computer to adopt a power state in which at least the processor is powered down if the detected identity of a process, or the detected identities of all the processes, running on the computer is/are in the set of previously identified processes.

18. The medium of claim 17, wherein the method further comprises:
   presenting the detected identity of the or each process running on the computer to an administrator for review of the processes so identified for the administrator to create a set of the identities of those processes which the administrator judges should not be allowed to maintain the computer in a high power state; and
   storing the set created by the administrator on the computer as the said set of identities of previously identified processes, or storing on the computer a link to the set created by the administrator.

19. A computer including a processor configured to:
   detect the identity of the or each process running on the computer which maintains the computer in a high power state in the absence of input activity;
   compare the identity of the or each process running on the computer with a set of identities of previously identified processes; and
   cause the computer to adopt a power state in which at least the processor is powered down if the detected identity of a process, or the detected identities of all the processes, running on the computer is/are in the set of previously identified processes.

20. The computer of claim 19 further comprising a digital storage device coupled to the processor, wherein the processor is further configured to:
   send the identity of the or each detected process to an administrator for review of the processes so identified, and for the administrator to create a set of the identities of those processes which the administrator judges should not be allowed to maintain the computer in a high power state; and
   store the set created by the administrator or a link to the set.

21. A network comprising an administrator's workstation, a database, and a plurality of computers, each computer having a processor, each processor configured to:
   detect the identity of each process running on the computer which maintains the computer in a high power state in the absence of input activity;
   compare the identity of each process running on the computer with a set of identities of previously identified processes; and
   cause the computer to adopt a power state in which at least the processor is powered down if the detected identity of a process, or the detected identities of all the processes, running on the computer is/are in the set of previously identified processes.

22. The network of claim 21, wherein each processor is further configured to:
   send the detected identities to the administrator for review of the processes so identified for the administrator to create a set of the identities of those processes which the administrator judges should not be allowed to maintain the computer in a high power state; and
   store the set created by the administrator on the computer as the said set of identities of previously identified processes, or store on the computer a link to the set created by the administrator.

23. A method of controlling power consumption in a computer, the method comprising:
   detecting, by the processor, the identities of processes running on the computer;
   comparing, by the processor, the identity of each detected process running on the computer with a set of identities of previously identified processes which are intended to maintain the computer in a high power state in the absence of input activity; and
   causing, by the processor, the computer to maintain a high power state if the detected identity of a process, or the detected identities of a processes, running on the computer is/are in the set of previously identified processes.

24. The method of claim 23, further comprising:
   sending, by the processor, the detected identity of each process running on the computer to an administrator for review of the processes so identified for the administrator to create a set of the identities of those processes which the administrator judges should be allowed to maintain the computer in a high power state; and
   storing the set created by the administrator on the computer as the said set of identities of previously identified processes, or store on the computer a link to the set created by the administrator.

* * * * *